(12) United States Patent
Garofalo et al.

(10) Patent No.: US 9,168,881 B2
(45) Date of Patent: Oct. 27, 2015

(54) AUTOMOTIVE ELECTRICAL SYSTEM PROVIDED WITH AN ALTERNATOR ELECTRONIC CONTROL SYSTEM

(75) Inventors: Fabio Garofalo, Turin (IT); Alessandro Riegel, Turin (IT); Angelo Sanapo, Turin (IT); Domenico Tavella, Turin (IT); Nando Vennettilli, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 430 days.

(21) Appl. No.: 13/884,245

(22) PCT Filed: Nov. 12, 2011

(86) PCT No.: PCT/EP2011/069989
§ 371 (c)(1),
(2), (4) Date: Aug. 5, 2013

(87) PCT Pub. No.: WO2012/062926
PCT Pub. Date: May 18, 2012

(65) Prior Publication Data
US 2013/0313897 A1    Nov. 28, 2013

(30) Foreign Application Priority Data
Nov. 12, 2010  (EP) .................................... 10425352

(51) Int. Cl.
| *B60L 1/00* | (2006.01) |
| *B60R 16/033* | (2006.01) |
| *B60L 1/02* | (2006.01) |
| *B60L 11/14* | (2006.01) |
| *B60L 11/18* | (2006.01) |
| *H02J 7/14* | (2006.01) |

(52) U.S. Cl.
CPC ................ *B60R 16/033* (2013.01); *B60L 1/02* (2013.01); *B60L 11/14* (2013.01); *B60L 11/1861* (2013.01); *H02J 7/1438* (2013.01); *B60L 2240/545* (2013.01); *B60L 2240/547* (2013.01); *B60L 2240/549* (2013.01); *B60L 2250/10* (2013.01); *Y02T 10/70* (2013.01); *Y02T 10/7005* (2013.01); *Y02T 10/705* (2013.01); *Y02T 10/7044* (2013.01); *Y02T 10/7077* (2013.01)

(58) Field of Classification Search
CPC ... B60R 16/033; B60L 11/1861; B60L 11/14; B60L 1/02; H02J 7/1438
See application file for complete search history.

(56) References Cited

U.S. PATENT DOCUMENTS

| 4,651,081 A | 3/1987 | Nishimura et al. |
| 5,608,309 A | 3/1997 | Hikita et al. |
| 2004/0174018 A1 | 9/2004 | Itoh |

FOREIGN PATENT DOCUMENTS

EP    0 735 641 A1    10/1996

*Primary Examiner* — Daniel Cavallari
(74) *Attorney, Agent, or Firm* — Dickstein Shapiro LLP

(57) ABSTRACT

Automotive electrical system for a motor vehicle comprising an internal combustion engine of a motor vehicle; the electric vehicle system comprising a series of electric vehicle loads, an electric battery, and an alternator generating a supply voltage of the electric vehicle loads and of the electric battery; the alternator comprising an inductive electric circuit adapted to be crossed by an electric control current; the electric vehicle system comprises an alternator electronic control system configured so as to determine a series of battery parameters (pam_bat) indicating the state of operation of the electric battery; determine at least a first vehicle parameter indicating the acceleration of the motor vehicle; determine the operative state of the internal combustion engine; determine an electric regulation voltage according to the operative engine station, to the vehicle parameter and to the battery parameters; vary an electric control current circulating in the inductive electric circuit of the alternator according to the electric regulation voltage.

21 Claims, 7 Drawing Sheets

AUTOMOTIVE ELECTRICAL SYSTEM PROVIDED WITH AN ALTERNATOR ELECTRONIC CONTROL SYSTEM

TECHNICAL FIELD OF THE INVENTION

The present invention relates to an automotive electrical system provided with an alternator electronic control system coupled to an internal combustion engine of a motor vehicle.

STATE OF THE ART

As is known the alternator is a vehicle electrical device which is rotated by the internal combustion engine, and therefore affects the overall consumptions and emissions of the engine itself in a non-negligible manner.

Automakers are gradually introducing alternator electronic control systems on motor vehicles in order to reduce fuel consumption and polluting emissions of the motor vehicles in urban traffic.

The currently known alternator electronic control systems essentially calculate an efficiency index according to the working point of the internal combustion engine, and are configured so as to control the revolution speed of the alternator rotor and/or to vary the energizing/field current thereof according to the calculated efficiency index.

However, the calculation of the efficiency index in the above-described electronic control systems is always rather complex and approximate, as the working point of the internal combustion engine is indirectly related to the current required from the alternator, which—as known—varies both according to the electric vehicle loads to be supplied, which are difficult to be predicted in advance, and to the voltage present at the ends of the terminals of the vehicle battery.

In addition to the above description, the alternator control by the known electronic control systems described above is limited to the torque pattern of the internal combustion engine, but does not consider the state of charge of the battery, which is thus subject to progressively discharging over time.

U.S. Pat. No. 4,651,081 discloses a control apparatus for a vehicular charging generator which detects an unstable rotation during the starting of an engine, the acceleration/deceleration condition of the engine, an overload condition of the engine etc. to regulate the output voltage of the generator by a micro-computer.

U.S. Pat. No. 5,608,309 discloses a vehicle alternating-current generator control system, wherein an arithmetic unit stores the difference between a target generation voltage commanded by the voltage command unit and a battery voltage detected by a voltage detection circuit and in which a voltage corresponding to the voltage difference is added to a command voltage generated by a voltage command unit.

EP 0 735 641 discloses a charge control system for an internal combustion engine which is capable of suppressing electromagnetic noise due to a control signal to a generator and of preventing an over-charge to a battery even if an input terminal receiving the control signal is grounded.

OBJECT AND SUMMARY OF THE INVENTION

The Applicant has conducted an in-depth study aiming at founding a solution which specifically allows to achieve the following objectives:

reducing the electric friction, and therefore the resistive torque caused by the alternator on the internal combustion engine of the motor vehicle, so as to reduce the energy wastes and improve the performance of the engine itself;

dynamically estimating the contribution of the electric loads of the alternator on the internal combustion engine so as to control the mechanical torque generated by the motor vehicle engine with greater accuracy;

increasing the average battery life;

reducing internal combustion engine consumptions and emissions.

It is thus the object of the present invention to provide a solution which allows to achieve the above-mentioned objectives.

This object is achieved by the present invention as it relates to an alternator electronic control system, as defined in the appended claims.

BRIEF DESCRIPTION OF THE DRAWINGS

FIG. 6 is a block diagram of a third regulation procedure implemented by the alternator electronic control system shown in FIG. 1; while

DETAILED DESCRIPTION OF PREFERRED EMBODIMENTS OF THE INVENTION

The present invention will now be described in detail with reference to the accompanying figures to allow a person skilled in the art to implement it and use it. Various changes to the described embodiments will be immediately apparent to people skilled in the art, and the described general principles may be applied to other embodiments and applications without therefore departing from the scope of protection of the present invention, as defined in the appended claims. Therefore, the present invention should not be considered as limited to the described and illustrated embodiments but instead the broadest scope of protection, in accordance with the principles and features described and claimed herein, is to be granted thereto.

Figure 1:
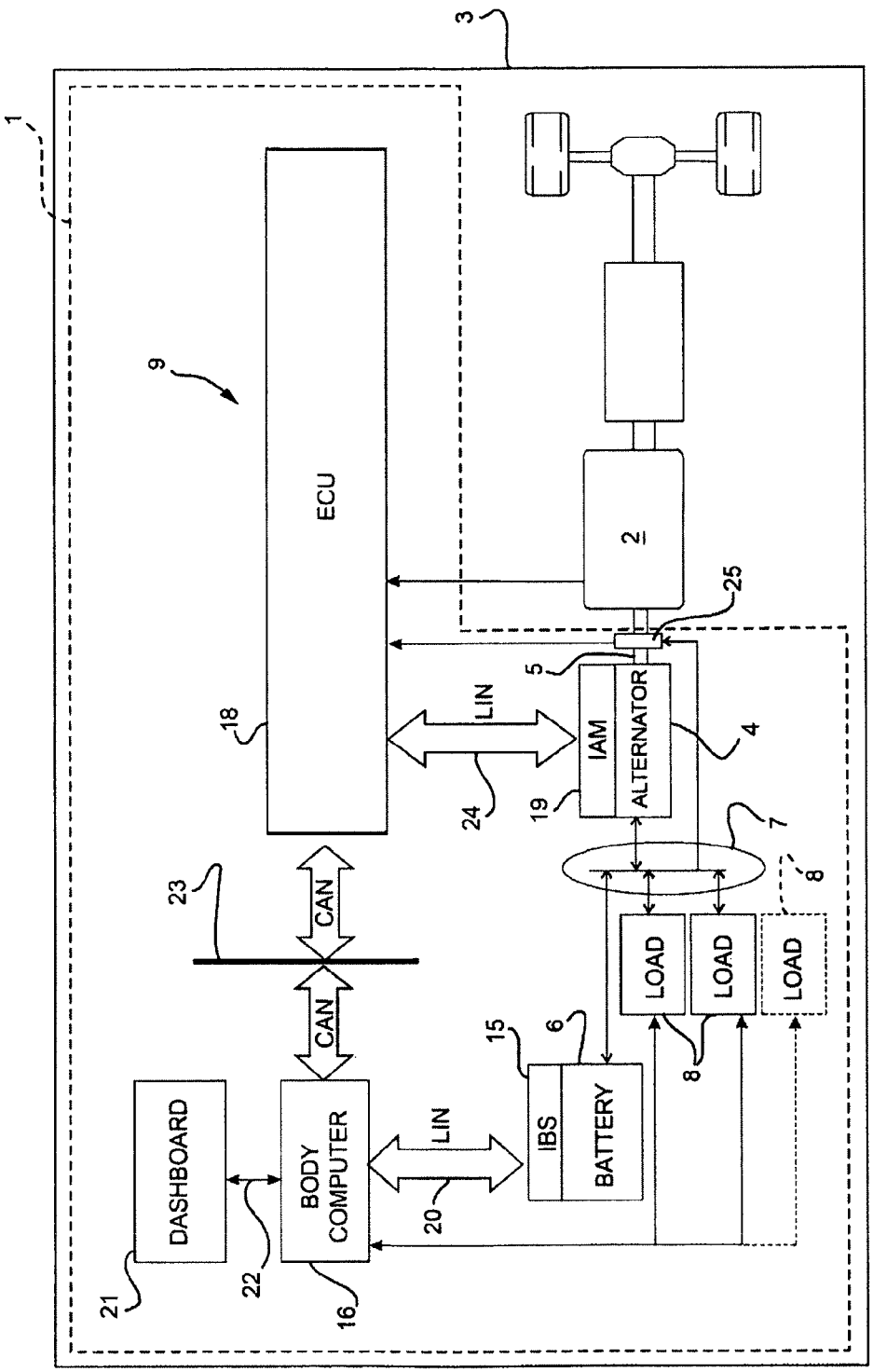
FIG. 1 is a block diagram of an vehicle electrical system for a motor vehicle made according to the dictates of the present invention.

By way of non-limitative example, FIG. 1 shows a block diagram of an automotive electrical system 1 comprising an internal combustion engine 2 of a motor vehicle 3 (diagrammatically shown).

The automotive electrical system 1 comprises an alternator 4, which is coupled to an internal combustion engine 2 by means of a motion transmission member 5 adapted to rotate the rotor of alternator 4 so as to output an electric supply voltage/current $V_{supply}/I_{supply}$.

Alternator 4 is of known type and will not be further described, except for specifying that it comprises an inductive electric circuit (not shown), which is adapted to be crossed by an electric control current $I_{reg}$ adapted to regulate the supply voltage $V_{sup}$ generated by the alternator 4 itself.

Motor vehicle 3 further comprises an electric battery 6 electrically connected to alternator 4 through an vehicle electrical system 7, and a series of vehicle electrical loads 8, which are electrically connected to alternator 4 and to electric battery 6 by means of the electric vehicle system 7.

The vehicle electrical loads 8 may comprise, for example, the electric system of the headlight system and/or the electric system of the wiper system and/or the electric system of the heated rear window system or any other type of similar electric/electronic device/apparatus which may be supplied by the alternator 4 present in motor vehicle 3.

The automotive electrical system 1 further comprises an alternator electronic control system 9 configured to vary said control current so as to regulate said supply voltage $V_{sup}$.

The alternator electronic control system 9 essentially comprises an Intelligent State Battery sensor 15 (IBS), a body computer 16, an electronic control unit 18, and an Intelligent Alternator Module 19 (IAM).

The Intelligent State Battery sensor 15 is electrically coupled to the electric battery 6 to monitor, instant by instant, the operating state, and is configured so as to measure and output a series of battery state parameters pam_bat.

In the example shown in FIG. 1, the measured battery state parameters pam_bat comprise: the internal battery temperature $t_{bat\_meas}$, the battery state of charge $SOC_{\_meas}$, the battery voltage $V_{bat\_meas}$, and the battery current $I_{bat\_meas}$.

The alternator electronic control system 9 further comprises a data communication line 20 connecting the Intelligent Battery State sensor 15 to the body computer 16. The Intelligent State Battery sensor 15 may be configured to communicate the battery state parameters pam-bat ($t_{bat\_meas}$, $SOC_{\_meas}$, $V_{bat\_meas}$, $I_{bat\_meas}$) to the body computer 16 over the data communication line 20. The data communication line 20 may be preferably, but not necessarily, made by means of a data/control bus implementing a LIN (Local Interconnect Network) protocol.

Body computer 16 determines the ON/OFF state of each of the vehicle electrical loads 8 connected to alternator 4, and is configured to determine, for each of the vehicle electrical loads 8 in the ON state, a supply constraint defined by an electric supply range, which is associated with an electric supply magnitude preferably corresponding to a voltage or electric current. The electric supply range is delimited above and below by maximum and minimum values of the electric magnitude, respectively, i.e. of the voltage or current.

Body computer 16 may be configured to determine the electric supply range of each vehicle electrical loads 8 according to the battery state parameters pam_bat.

For this purpose, body computer 16 may be provided with an internal memory (not shown) containing one or more predetermined operating maps of the vehicle electrical loads 8 associated with the supply constraints of the latter. Each operating map is capable of providing the electric supply range, i.e. the maximum and minimum voltage/current values to be supplied to the corresponding vehicle electrical load 8 as the battery state parameters pam_bat vary.

Each operating map comprises, for each state/battery parameter or for each group of state/battery parameters, a corresponding electric supply range delimited above by a maximum acceptable value and below by a minimum acceptable voltage/current value which may be supplied to the vehicle electrical load 8.

In the following example, for description simplicity but without loosing in generality, an electric supply range delimited by maximum and minimum supply voltage values, indicated with $\Delta V(Vmin_i, Vmax_i)$ will be considered, where $Vmin_i$ is the minimum supply voltage, while $Vmax_i$ is the maximum supply voltage of the i-th vehicle electrical load 8.

Body computer 16 is further configured to determine a main constraint, i.e. a main electric supply range $\Delta Vlimit$ ($VMIN_P, VMAX_P$) according to the maximum/minimum voltages $Vmax_i, Vmin_i$ which delimit the electric supply ranges $\Delta V(Vmin_i, Vmax_i)$ of the single vehicle electrical loads 8 on the ON states. For this purpose, body computer 16 may determine the main maximum voltage $VMAX_P$ and the main minimum voltage $VMIN_P$ assigning the maximum and minimum voltage values, respectively, present in the electric supply ranges $\Delta V(Vmin_i, Vmax_i)$ of the vehicle electrical loads 8.

Body computer 16 is further able to receive diagnostic input data of alternator 4 and to communicate them to a vehicle dashboard 21 over a data communication line 22, so as to signal a malfunctioning condition of alternator 4, e.g. by means of an alternator warning light (not shown) present on the vehicle dashboard 21 itself.

Body computer 16 is further configured to communicate with the electronic control unit 18 over a communication line 23 so as to provide the electronic control unit 18 with the main power supply range $\Delta Vlimit(VMIN_P, VMAX_P)$ and the battery state parameters pam_bat, and to receive the diagnostic data of alternator 4 therefrom. In the example shown, the communication line 23 preferably, but not necessarily, comprises one or more CAN buses.

The intelligent alternator control module 19 is configured to receive a regulation voltage $V_{reg}$ over a data communication line 24 from the electronic control unit 18. In the example shown in FIG. 1, the data communication line 24 preferably, but not necessarily, comprises a LIN bus.

The intelligent alternator control module 19 is electrically connected to alternator 4, is configured so as to diagnose the operating state of alternator 4, and communicates the alternator diagnostic data to the electronic control unit 18 over the data communication line 24.

The intelligent alternator control module 19 is further configured so as to regulate the energizing/control current $I_{reg}$ circulating through the inductive/field circuit of alternator 4 according to the regulation voltage $V_{reg}$ so as to generate the supply voltage $V_{supply}$. For example, the intelligent alternator control module 19 may preferably, but not necessarily, comprise a PWM type current regulator able of varying the duty cycle of the energizing/control current $I_{reg}$ supplied to the inductive/field circuit of alternator 4 according to the regulation voltage $V_{reg}$. The intelligent alternator control module 19 may be configured to communicate the duty cycle indicating data of the energizing/control current $I_{reg}$ of alternator 4 to the electronic control unit 18.

This value may be used by the electronic control unit 18 to determine the structural effectiveness limits of the different control configurations of the regulation voltage $V_{reg}$, for example, according to the working load of alternator 4, as well as to determine the calculation of the friction contribution caused by alternator 4.

The electronic control unit 18 is configured to determine the regulation voltage $V_{reg}$ to be supplied to the intelligent alternator control module 19 according to: a series of operative vehicle states (described in detail below), the main supply range $\Delta Vlimit(VMIN_P, VMAX_P)$ determined by body computer 16, the battery state parameters par_bat, and a series of vehicle data.

The electronic control unit 18 is configured to determine a series of engine operating parameters, indicated hereinafter as engine parameters, such as, for example, the engine rpm en_sp, the external temperature $t_{es}$ of the motor vehicle, the torque load_v and the motor vehicle speed vh_sp. For this purpose, the alternator electronic control system 9 may be provided with specific sensors adapted to measure/determine the engine rpm en_sp, the external temperature $t_{es}$ of the motor vehicle, the torque generated by the internal combustion engine load_v, and the speed of the motor vehicle vh_sp.

The electronic control unit 18 is further configured to implement a series of alternator control procedures/algorithms of alternator 4 (described in detail below) according to a series of operative conditions/states of the internal combustion engine 2 of motor vehicle 3.

Figure 2:
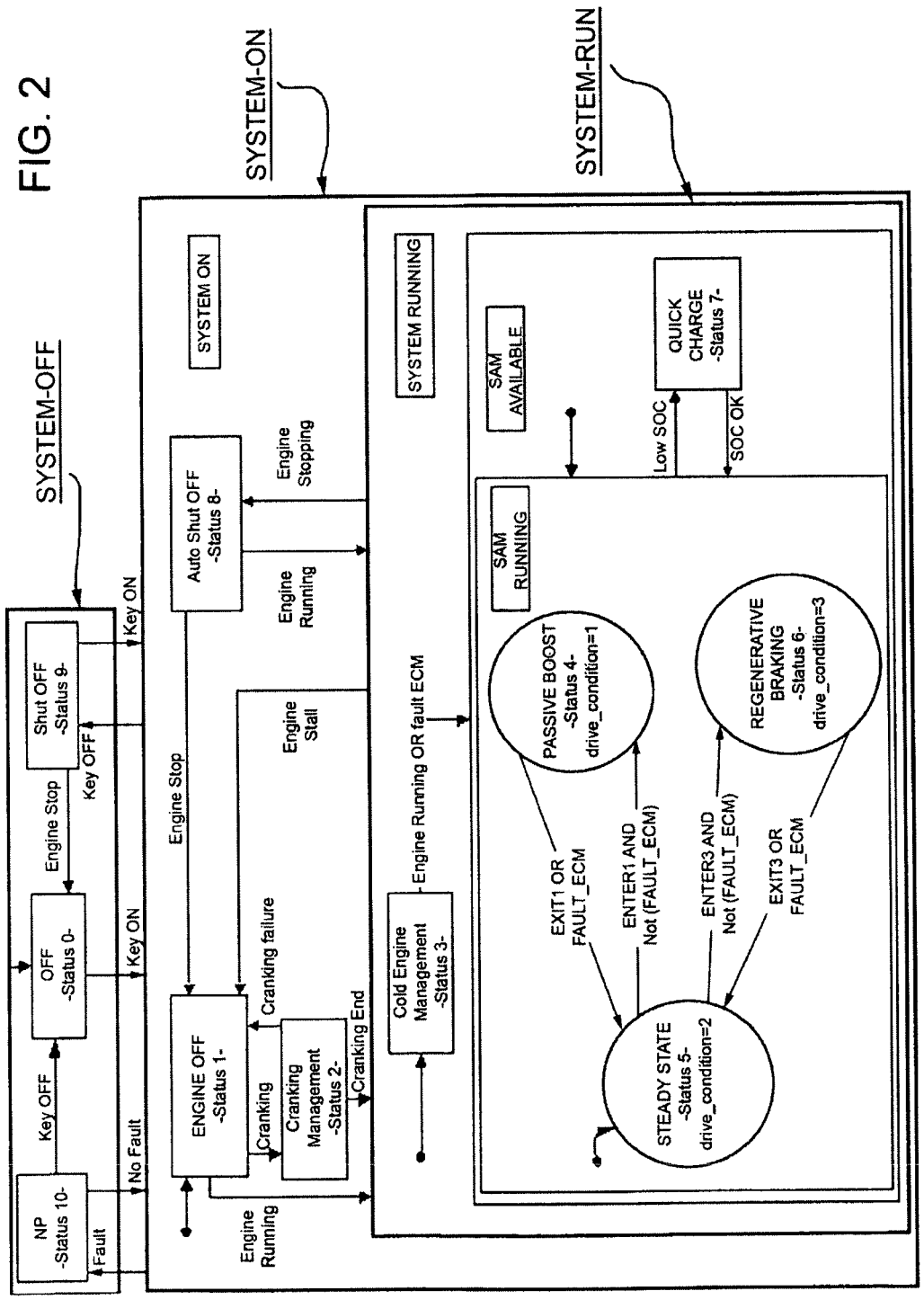
FIG. 2 is a state machine indicating the states of the motor vehicle engine shown in FIG. 1.

By way of example, FIG. 2 diagrammatically shows a diagram containing some operative functioning states of motor vehicle 3, indicated below as "engine operative states", and the corresponding transition modes from one operative state to the other. The engine operative states which are relevant for understanding the present invention essentially comprise a SYSTEM RUNNING state (Cold Engine Management, Passive Boost, Regenerative Braking, Steady State, Quick Charge blocks), during which the internal combustion engine 2 is running; a SYSTEM-ON state (ENGINE OFF, AUTO SHUT OFF, CRANKING MANAGEMENT blocks), associated with a cranking condition, during which the internal combustion engine is transiting from an off condition to the SYSTEM RUNNING state; and a SYSTEM-OFF state (NP, OFF, SHUTOFF blocks), associated with a condition in which the internal combustion engine 2 is transiting from the SYSTEM RUNNING state to an off state.

Figure 3:
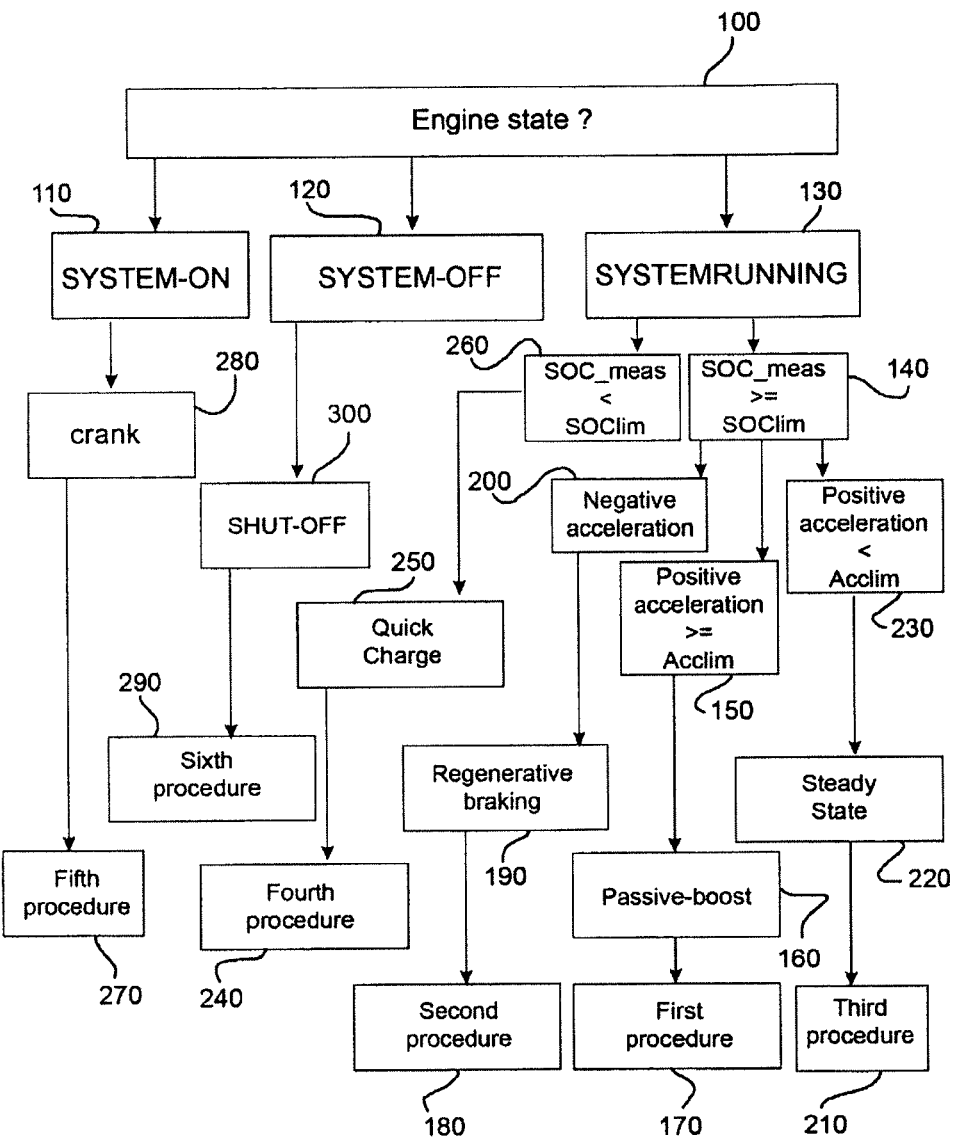
FIG. 3 is a flow chart containing the operations implemented by the alternator electronic control system according to the dictates of the present invention.

With reference to FIGS. 2 and 3, the electronic control unit 18 is configured to determine the operative engine state (block 100) which, as mentioned above, may be a SYSTEM-ON state (block 110), a SYSTEM-OFF state (block 120) or a SYSTEM RUNNING state (block 130).

In particular, the electronic control unit 18 is configured so as to implement a first regulation/control procedure/algorithm of alternator 4 (block 170) (described in detail below) when, during the SYSTEM RUNNING state, it determines a first operative state, indicated hereinafter as a PASSIVE BOOST state.

In particular, the electronic control unit 18 is configured to determine the PASSIVE BOOST state (block 160) when, during the SYSTEM RUNNING state, the following conditions occur: the measured battery state of charge SOC_meas is either higher than or equal to a predetermined charge threshold SOClim (block 140); a first magnitude, indicating the acceleration Acc of the motor vehicle is positive and is either higher than or equal to a first acceleration threshold Acclim (block 150). For this purpose, the first magnitude may correspond to the acceleration Acc of the vehicle and/or to the mechanical torque generated by the internal combustion engine 2, and/or to the derivative of the mechanical torque generated by the engine 4 itself over time.

In particular, the electronic control unit 18 is further configured to implement a second control algorithm/procedure of alternator 4 (block 180) (described in detail below) when, during the SYSTEM RUNNING state, it determines a second operative state, indicated below as a REGENERATIVE BRAKING state (block 190).

With reference to FIG. 3, the electronic control unit 18 determines the REGENERATIVE BRAKING state (block 190) when, during the SYSTEM RUNNING state, the following conditions occur: the measured battery charge state SOC_meas is either higher than or equal to a predetermined charge threshold SOClim (block 140); the first magnitude, indicating the acceleration of motor vehicle 3, is negative (block 200) and thus indicates that motor vehicle 3 is subjected to a deceleration caused, for example, by braking and/or by means of a cut-off of the motor vehicle 3 itself.

Furthermore, the electronic control unit 18 is configured so as to implement a third control algorithm/procedure of alternator 4 (block 210) (described in detail below) when, during the SYSTEM RUNNING state, it determines a third operative state, indicated below as a STEADY STATE (block 220).

With reference to FIG. 3, the electronic control unit 18 determines the STEADY STATE when, during the SYSTEM RUNNING state, the measured battery state of charge SOC_meas 12 is higher than the predetermined charge threshold SOClim (block 140) and the first magnitude, indicating the acceleration of motor vehicle 3, is positive and lower than the first predetermined threshold (block 230).

Furthermore, the electronic control unit 18 is configured so as to implement a fourth control algorithm/procedure of alternator 4 (block 240) (described in detail below) when it determines a fourth operative state, indicated hereinafter as a QUICK CHARGE state (block 250).

In particular, the electronic control unit 18 determines the QUICK CHARGE state when, during the SYSTEM RUNNING state, the state of measured charge SOC_meas of the electric battery 6 is lower than the predetermined charge threshold SOClim (block 260).

Furthermore, the electronic control unit 18 is configured so as to implement a fifth control algorithm/procedure of alternator 4 (block 270) (described in detail below) when, during the SYSTEM-ON state, it determines a fifth operative state, indicated hereinafter as a CRANK state (block 280). The electronic control unit 18 determines the CRANK state when the internal combustion engine 2 is in the cranking state.

Furthermore, the electronic control unit 18 is configured so as to implement a sixth control algorithm/procedure of alternator 4 (block 290) (described in detail below) when, during the SYSTEM-OFF state, it determines a sixth operative state, indicated hereinafter as a SHUTOFF/AUTOSHUTOFF state (block 300). The electronic control unit 18 determines the SHUTOFF/AUTOSHUTOFF state when the internal combustion engine 2 is shut off by a manual control or by an automatic control, respectively.

Figure 4:
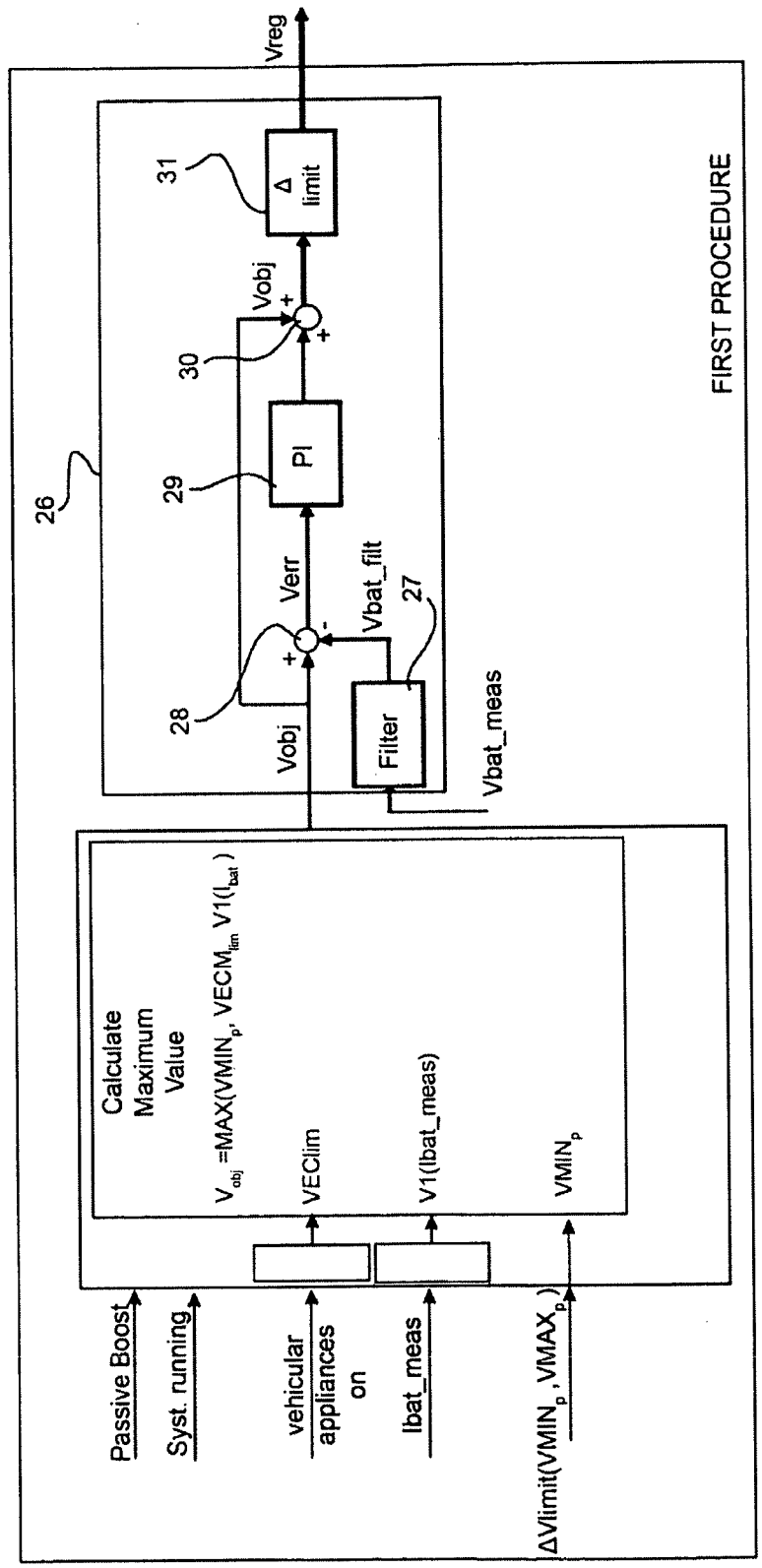
FIG. 4 is a block diagram of a first regulation procedure implemented by the alternator electronic control system shown in FIG. 1.

With reference to FIG. 4, the first control procedure/algorithm of alternator 4 implemented by the electronic control unit 18 essentially comprises the steps of: determining an objective voltage $V_{obj}$, calculating an error signal $V_{err}$ indicating the difference between objective voltage $V_{obj}$ and measured battery voltage $V_{bat\_meas}$, determining the regulation voltage $V_{reg}$ by means of an open-loop regulation system/circuit 26 according to the error signal $V_{err}$ and to the objective voltage $V_{obj}$.

In particular, the objective voltage $V_{obj}$ is calculated according to the main electric supply range $\Delta V$limit(VMIN$_P$, VMAX$_P$), to the battery current $I_{bat\_meas}$, and to an on/off state of electric vehicle appliances 25 rotationally fed by the internal combustion engine 2.

The first control procedure/algorithm of alternator 4 determines the objective voltage $V_{obj}$ by means of the following steps: calculating a voltage VECM$_{lim}$ related to the electronic vehicle appliances 25 rotationally fed by the internal combustion engine 2 itself which, for example, the engine cooling fan unit rotating at a predetermined speed, and/or the DPF (Diesel Particulate Filter) regeneration unit; and calculating a voltage $V1(I_{bat})$ related to the generation of a battery current $I_{batt}$ by the electric battery 6.

Voltage VECM$_{lim}$ corresponds to a predetermined minimum value of the regulation voltage of alternator 4 so that the voltage generated by alternator 4 is sufficient to supply said active electronic vehicle appliances 25, while voltage V1($I_{bat}$) substantially corresponds to a minimum, predetermined voltage value needed to prevent the electric battery 6 from discharging during the delivery of current $I_{bat}$ by the latter.

The first control procedure/algorithm of alternator 4 calculates the objective voltage $V_{obj}$ thus determining the upper extreme, i.e. the maximum value between: the lower voltage $VMIN_P$ of the main electric supply range $\Delta Vlimit(VMIN_P, VMAX_P)$, the voltage $VECM_{lim}$ and the voltage V1($I_{bat\_meas}$). In detail, $V_{obj}$=MAX($VMIN_P$, $VECM_{lim}$, V1($I_{bat\_meas}$)).

Upon the calculation of the objective voltage $V_{obj}$, the first control procedure/algorithm of alternator 4 determines the regulation voltage $V_{reg}$ by means of the open-loop regulation system/circuit 26 of the proportional-integral PI type described in detail below.

Figure 5:
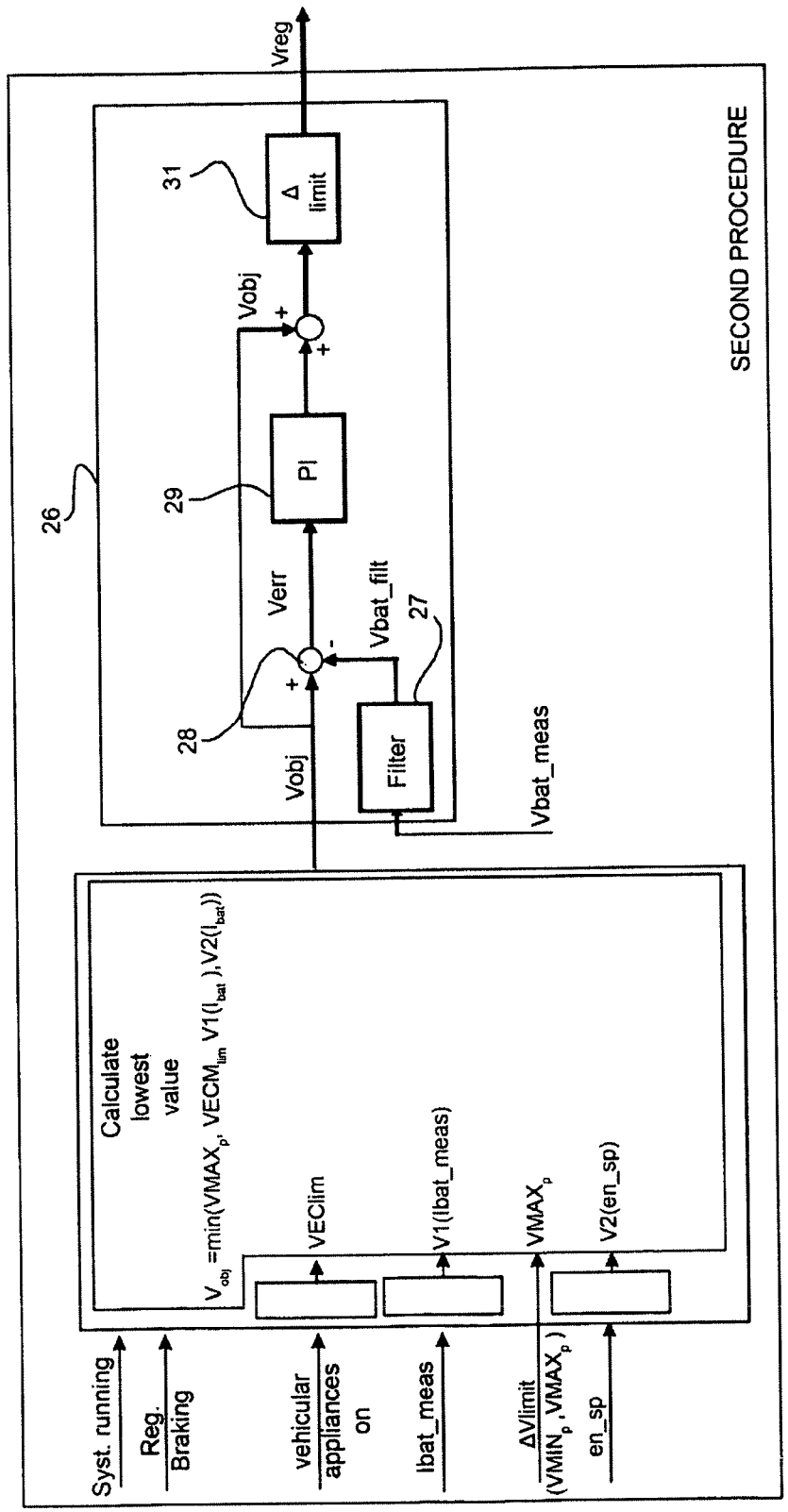
FIG. 5 is a block diagram of a second regulation procedure implemented by the alternator electronic control system shown in FIG. 1.

With reference to FIG. 5, the second control procedure/algorithm of alternator 4 essentially comprises the steps of: determining an objective voltage $V_{obj}$, calculating an error signal $V_{err}$ indicating the difference between objective voltage $V_{obj}$ and measured battery voltage $V_{bat\_meas}$, determining the regulation voltage $V_{reg}$ by means of an open-loop regulation system/circuit 26 according to the error signal $V_{err}$ and to the objective voltage $V_{obj}$.

In particular, the objective voltage $V_{obj}$ is calculated according to the following parameters: the voltage $VECM_{lim}$ related to the actuation of the electronic vehicle appliances 25; the voltage V1($I_{bat\_meas}$) related to the battery current $I_{batt\_meas}$; the voltage V2(en_sp) related to the engine rpm en_sp.

Voltage V2(en_sp) corresponds to a predetermined minimum value determined so as to limit the braking torque variation caused on the internal combustion engine by the electric frictions produced by the alternator, so as to advantageously ensure a gradual, i.e. not pulsing, transition of the engine itself from a normal operating condition to an idling operative condition, in which the rotation speed of the internal combustion engine 2 has a predetermined minimum value.

The second control procedure/algorithm of alternator 4 calculates the objective voltage $V_{obj}$ determining the lower extreme, i.e. the minimum value between: the upper voltage $VMIN_P$ of the main electric supply range $\Delta Vlimit(VMIN_P, VMAX_P)$, the voltage $VECM_{lim}$, the voltage V1($I_{bat\_meas}$) and the voltage V2 (en_sp). In detail, $V_{obj}$=min ($VMAX_P$, $VECM_{lim}$, V1($I_{bat}$), V2($I_{bat}$)).

The second control procedure/algorithm of alternator 4, when motor vehicle 3 is in a deceleration state, thus controls the regulation voltage $V_{reg}$ of alternator 4 assigning the highest possible value thereto, compatibly with the limits/constrains determined by the main electric supply range, by the actuation of the vehicle appliances 25 and by the electric battery 6.

Upon the calculation of the objective voltage $V_{obj}$, the second control procedure/algorithm of alternator 4 determines the regulation voltage $V_{reg}$ by means of the regulation system/circuit 26 (either open-loop or closed-loop).

From the above description, it is further worth noting that by assigning the "highest" possible value to the objective voltage $V_{obj}$ related to the regulation voltage $V_{reg}$ of alternator 4 by means of the second procedure/algorithm, a controlled increase of the electric friction exerted by alternator 4 on the internal combustion engine 2 is thus determined, which allows to obtain, on one hand, a reduction of the torque delivered by the internal combustion engine 2 during the step of decelerating and, on the other hand, ensures a delivery of voltage by alternator 4 which is sufficient to supply both the vehicle appliances 25 and the electric battery 6.

It is further worth noting that by assigning the "lowest" possible value to the objective voltage $V_{obj}$ related to the regulation voltage $V_{reg}$ of alternator 4 by means of the first procedure/algorithm, a controlled decrease of the electric friction exerted by alternator 4 on the internal combustion engine 2 is thus advantageously determined, which allows to obtain, on one hand, an increase of the torque delivered by the internal combustion engine 2 with a reduction of consumptions/emissions of the engine itself and, on the other hand, ensures a delivery of voltage by alternator 4 which is sufficient to supply both the vehicle appliances 25 and the electric battery 6.

With reference to the example shown in FIGS. 4 and 5, the open-loop regulation system/circuit 26 used by the first and second control procedures/algorithms described above comprises a filtering block 27, an adder block 28, a proportional-integral block 29, an adder block 30, and a gradient limiting block 31.

Filtering block 27 may preferably, but not necessarily, be a mobile average low-pass filter configured so as to: receive the input battery voltage $V_{bat\_meas}$, filter the battery voltage $V_{bat\_meas}$ from the high frequencies so as to advantageously eliminate reading noises introduced by the intelligent battery state sensor 15, and to output the filtered battery voltage $V_{bat\_filt}$.

The adder block 28 is configured so as to: receive the input objective voltage $V_{obj}$ and the filtered battery voltage $V_{bat\_filt}$, output an error signal $V_{err}$ indicating the difference between the measured battery voltage $V_{bat\_meas}$ and the objective voltage ($V_{obj}$).

The proportional-integral block 29 is configured so as to multiply the error signal $V_{err}$ by a predetermined constant K1 and integrates the error signal multiplied by a second constant $V_{err}$*K2 (not necessarily equal to K1) over time.

The adder block 30 is configured to receive an input error signal $V_{err}$ output by the proportional-integral block 29 and the objective voltage $V_{obj}$, and output a compensated target value $V_{obj}'$ corresponding to the sum $V_{err}$ and objective voltage $V_{obj}$.

The gradient limiting block 31 is configured so as to: receive the compensated input objective voltage $V_{obj}'$, limit the derivative of the compensated objective voltage $V_{obj}'$ over time (preferably a discrete derivative) so as to keep it within a predetermined maximum-minimum range, and output the regulation voltage $V_{reg}$ of alternator 4.

The open-loop contribution further ensures a more gradual control of the regulation voltage $V_{reg}$, which will approach the objective $V_{obj}$ without producing under/over-shunting, nor non-zero errors when running, while the closed-loop contribution ensures a recovery of possible charge dispersions in the electric system consisting of alternator 4 and electric battery 6.

The third control procedure/algorithm of alternator 4 provides for the electronic control unit 18 to regulate the voltage $V_{reg}$ so as to keep an optimal SOC, in addition to the above-described conditions. The third control procedure/algorithm of alternator 4 comprises the step of determining the regulation voltage $V_{reg}$ according to a difference $\Delta$SOC between the objective stage of charge $SOC_{\_obj}$ of the electric battery 6 and the measured state of charge $SOC_{\_meas}$ thereof and by means of a closed-loop control system/circuit 32.

Figure 6:
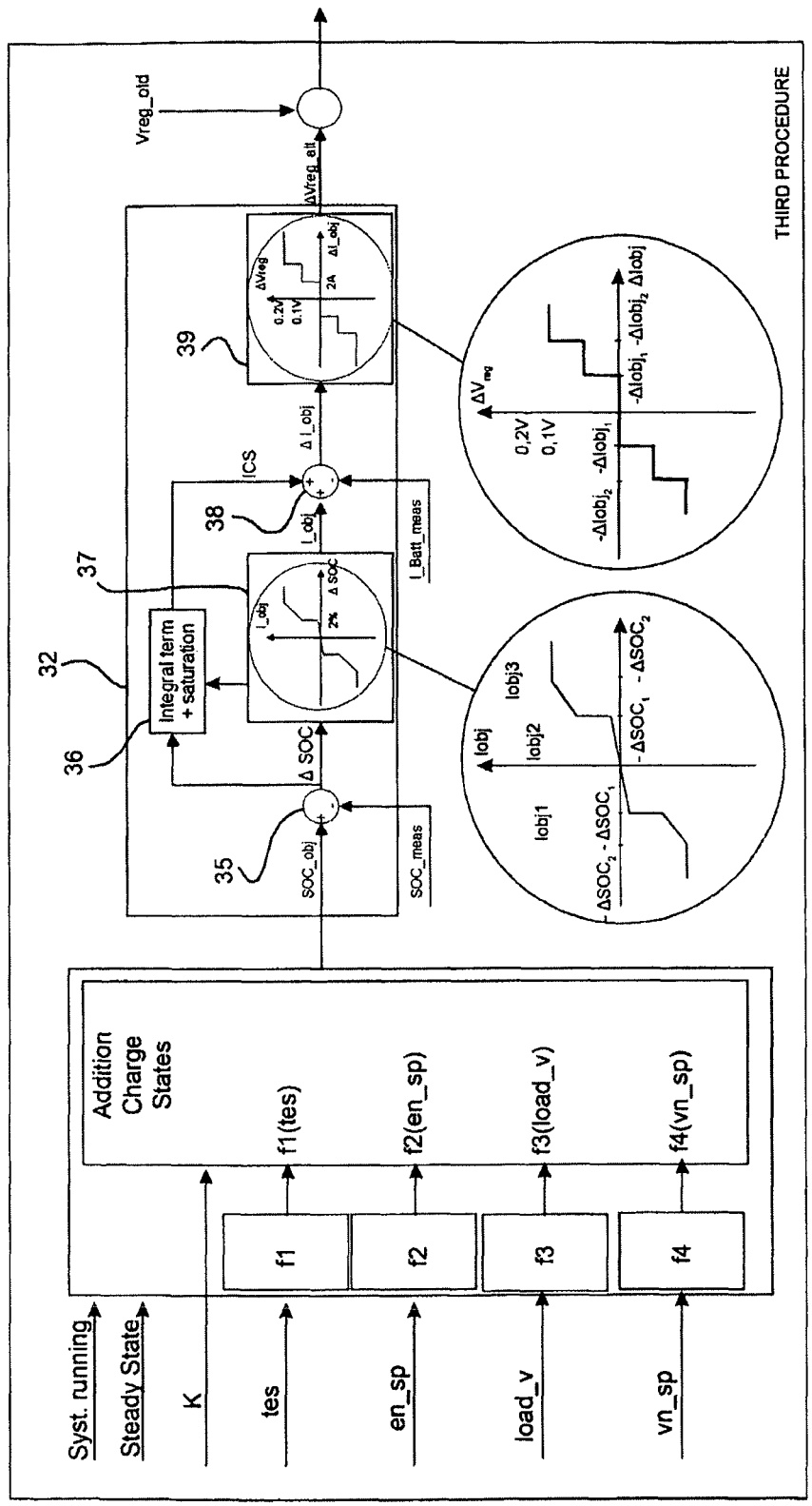

With reference to FIG. 6, the electronic control unit 18 is configured to determine the objective state of charge $SOC_{obj}$ according to a series of data indicating the following parameters: the engine speed en_sp, the motor vehicle speed vn_sp, the torque load_v of the internal combustion engine 2 and the ambient temperature tes external to the electric battery.

For this purpose, the electronic control unit 18 may determine the objective state of charge $SOC_{obj}$ by means of the following function:

$$SOC_{obj} = K + f1(vn\_sp) + f2(en\_sp) + f3(load\_v) + f4(tes))$$

wherein K is a predetermined constant, f1(vn_sp) is a function which allows to determine a value indicating a state of charge as the vehicle speed varies; f2(en_sp) is a function which allows to determine a value indicating the state of charge of the battery as the engine speed varies; f3(load_v) is a function which allows to determine a value indicating the state of charge of the battery as the torque varies; f4(tes) is a function which allows to determine a value indicating a state of charge of the battery as the external temperature of the electric battery 6 varies.

The closed-loop control system/circuit 32, shown in FIG. 6, used by the electronic control unit 18 during the implementation of the third control procedure/algorithm of alternator 4 comprises: an adder block 35, a regulation block 37, a compensator block 36, an adder block 38 and a calculation block 39.

The adder block 35 is configured so as to receive the input objective state of charge $SOC_{obj}$ and the measured state of charge $SOC_{meas}$ and output a signal indicating the difference of charge $\Delta SOC$ between the two states.

The regulator block 37 is configured so as to calculate an objective current $I_{obj}$ according to the difference of charge $\Delta SOC$, by means of a function $I_{obj}(\Delta SOC)$ displaying a substantially discontinuous linear pattern provided with segments having mutually different angular coefficients.

With reference to the example shown in FIG. 6, the function $I_{obj}$ comprises a first linear segment $I_{obj1}(\Delta SOC)$ comprised between $-\Delta SOC_1$ and $\Delta SOC_1$ and displaying a minimum angular coefficient m1, approximately equal to zero, a second segment $I_{obj2}(\Delta SOC)$ comprised between $-\Delta SOC_1$ and $-\Delta SOC_2$ and between $\Delta SOC_1$ and $\Delta SOC_2$, having an angular coefficient m2 higher than the coefficient m1, and a third segment $I_{obj3}(\Delta SOC)$ associated with the charge values $\Delta SOC$ lower than $-\Delta SOC_2$ and higher than $\Delta SOC_2$, having an angular coefficient m3 substantially equal to zero. The difference of charge $\Delta SOC_1$ may be preferably equal to approximately 2% of the nominal SOC of the electric battery 6, while the third segment $I_{obj3}(\Delta SOC)$ may correspond to a current objective equal for example to approximately 75% of the maximum currently which may be delivered by alternator 4.

The compensator block 36 is configured so as to receive the input difference of charge $\Delta SOC$ and the objective current $I_{obj}$ and outputs a compensation factor ICS of the objective current $I_{obj}$ itself. The compensator block 36 is activated when the following condition occurs: the absolute value of the objective current is lower than a predetermined threshold max_drift related to possibly dissipations of current $I_{obj}$ along the measuring chain, and the absolute value of the difference of charge $|\Delta SOC|$ is higher than a predetermined minimum error.

The compensator block 36 is configured so as to determine the compensation factor ICS dimensioned to compensate for the dissipations of current along the measuring chain which may induce a running error of the difference of charge $\Delta SOC$.

The adder block 38 is configured so as to receive the measured input battery current $I_{bat\_meas}$, the objective current $I_{obj}$, and the compensation factor ICS and determine the objective current difference $\Delta I_{obj}$ in the following manner:

$$\Delta I_{obj} = I_{obj} + ICS - I_{bat\_meas}$$

The calculation block 39 is configured so as to receive the objective current difference $\Delta I_{obj}$ and output a variation of the voltage $\Delta V_{reg}$ by means of a function $\Delta V_{reg} = fg(\Delta I_{obj})$.

In the example shown in FIG. 6, the function $\Delta V_{reg} = fg(\Delta I_{obj})$ is in a stepped function and includes a zero step $\Delta V_{reg} = 0$ in the objective current variation range $(-\Delta_{obj1}, \Delta I_{obj1})$, a first step $\Delta V_{reg} = -VR1, VR1$ in the objective current variation ranges $(\Delta I_{obj1}, \Delta I_{obj2})$ and $(-\Delta I_{obj1}, -\Delta I_{obj2})$ respectively, and a second step $\Delta V_{reg} = -VR2, VR2$ wherein $|VR2| > |VR1|$ in the objective current variation ranges $(-\Delta I_{obj1}, -\Delta I_{obj2})$ and $(\Delta I_{obj1}, \Delta I_{obj2})$ respectively. In the example shown, $|VR1|$ is equal to approximately 0.1V, $|VR2|$ is equal to approximately 0.2V, $|\Delta I_{obj1}| = 2$ A, $|\Delta I_{obj2}| = 4$ A.

Figure 7:
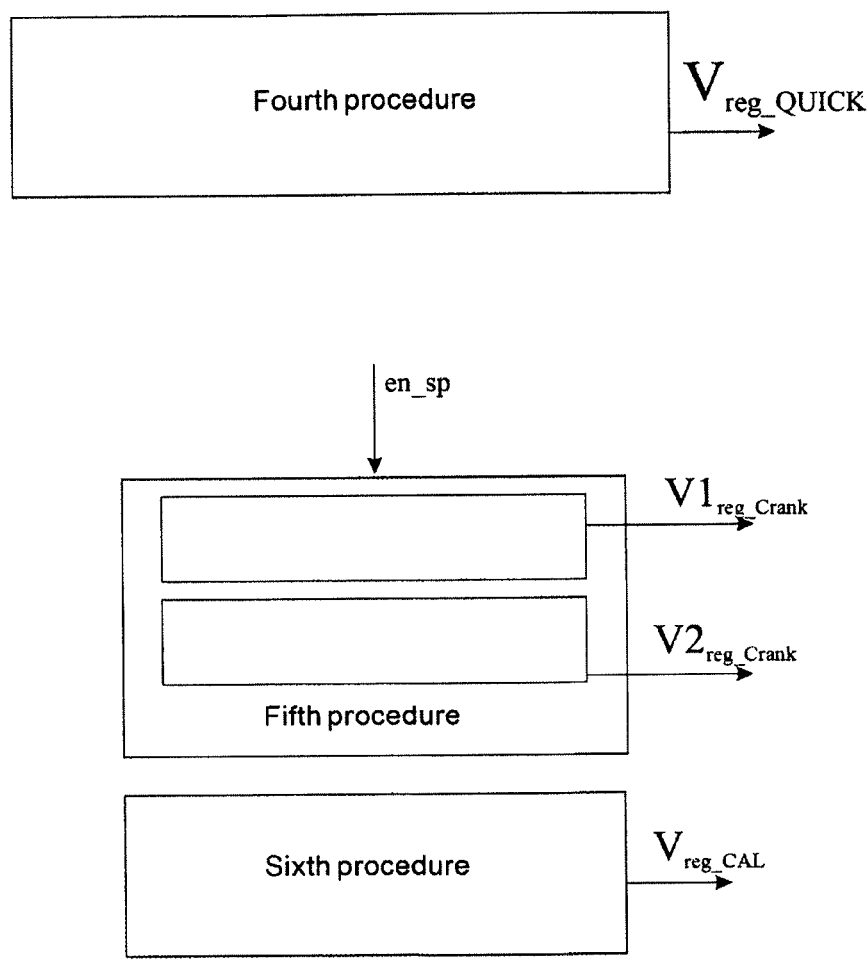
FIG. 7 is a block diagram of fourth, fifth and sixth regulation procedures implemented by the alternator electronic control system shown in FIG. 1.

With reference to FIG. 7, the fourth control procedure/algorithm of alternator 4 provides for the electronic control unit 18 to regulate the regulation voltage $V_{reg}$ of alternator 4 to the highest voltage level possible when SOC is too low.

The fourth control procedure/algorithm of alternator 4 comprises the step of generating a predetermined regulation voltage $V_{reg\_QUICK}$ having value equal, for example, to 95% of a nominal battery voltage $V_{bat\_nom}$.

The fifth control procedure/algorithm of alternator 4, instead, provides for the electronic control unit 18 when cranking and according to the engine rpm en_sp to define two sub-steps of cranking in which the regulation voltage $V_{reg}$ is kept low at first, to facilitate the increase of rpm, and is then kept high to reduce the rpm overshoot after cranking.

The fifth control procedure/algorithm of alternator 4 comprises the step of generating a first minimum predetermined regulation voltage $V1_{reg\_Crank}$, when during cranking, the rpm en_sp is lower than a predetermined threshold EN1, and a second predetermined maximum regulation voltage $V2_{reg\_Crank}$, when during cranking, the engine rpm en_sp is either higher or lower than the threshold EN1.

The sixth control procedure/algorithm of alternator 4 instead comprises the step of generating a predetermined regulation voltage $V_{reg\_CAL}$ having a calibratable value comprised between 13.5 V and 14.5 V.

The electronic control unit 18 may further be configured to implement the third control procedure/algorithm of alternator 4 at predetermined intervals of time following a $SOC_{obj}$ equal, for example, to 95%, so as to run a "Battery Regeneration" cycle, thus advantageously reducing the so-called "memory effect" and ensuring a longer life to the electric battery. In particular, the "Battery Regeneration" cycle is configured to fully recharge the battery at predetermined intervals of time, such as for example one or two months.

The advantages that the present invention allows to obtain are apparent from the above description.

The present invention reduces electric friction and therefore the resistive torque caused by the alternator on the internal combustion engine of the motor vehicle determining, on one hand, a decrease of wastes of energy and, on the other hand, improves performance of the engine itself.

The present invention further allows to dynamically estimate the contribution of electric loads of the alternator on the internal combustion engine so as to control the mechanical torque generated by the motor vehicle engine. Indeed, both the friction contribution caused by the alternator (in the duty cycle function of IAM) and the idling objective (according to battery SOC) may be dynamically estimated to improve handling in all engine conditions.

The present invention further allows to advantageously increase the average battery life and to reduce internal combustion engine consumption and emissions. In particular, the studies carried out by the Applicant demonstrated that the reduction of consumption deriving from the above-described control system is of the order of 2-3% on the NEDC cycle.

The present invention further allows to advantageously obtain an optimal adaptation to the various engine configurations. Indeed, the same algorithm structure may be applied to any type of internal combustion engine provided with IAM+LIN+IBS architecture, regardless of the engine/transmission coupling, on both aspirated and turbocharged engines, for all types of fuel.

It is finally apparent that changes and variations may be made to the above-disclosed description without departing from the scope of protection of the present invention, as defined in the appended claims.

The invention claimed is:

1. Automotive electrical system (1) for a motor vehicle (3) comprising an internal combustion engine (2) of a motor vehicle (3); the automotive electrical system (1) comprising a number of electric vehicle loads (8), an electric battery (6), and an alternator (4) operable by the internal combustion engine (2) for generating a supply voltage ($V_{sup}$) adapted to be supplied to the electric vehicle loads (8) and to the electric battery (6); the alternator (4) comprising an inductive electric circuit adapted to be crossed, in use, by an electric control current ($I_{reg}$) adapted to regulate the supply voltage ($V_{sup}$); said automotive electrical system (1) comprising an alternator electronic control system (9) configured to vary said control current ($I_{reg}$) so as to regulate said supply voltage ($V_{sup}$); said alternator electronic control system (9) is further configured to:
  determine a series of battery parameters (pam_bat) indicating the operating state of the electric battery (6);
  determine at least one first vehicle parameter (Acc) indicating the acceleration of the motor vehicle (3);
  determine the operative state of the internal combustion engine (2);
  determine an electric regulation voltage ($V_{reg}$) according to said operative state of the engine, to the vehicle parameter (Acc) and to said battery parameters (pam_bat);
  vary the electric control current ($I_{reg}$) circulating, in use, in the inductive electric circuit of the alternator (4) according to said electric regulation voltage ($V_{reg}$);
said automotive electrical system (1) being characterized in that said alternator electronic control system (9) is configured to implement a first regulation procedure to reduce said electric regulation voltage ($V_{reg}$) when a first condition is determined, wherein:
  the operative state of the internal combustion engine corresponds to an engine running state (SYSTEM RUNNING);
  a battery parameter (pam_bat) indicating the battery state of charge ($SOC_{meas}$) is either higher than or equal to a predetermined charge threshold ($SOC_{lim}$); and
  said first vehicle parameter (Acc) indicating the acceleration of the motor vehicle (3) is either higher than or equal to a first predetermined acceleration threshold (ACClim).

2. Automotive electrical system according to claim 1, wherein the system is configured to implement a second regulation procedure adapted to increase said electric regulation voltage ($V_{reg}$) when a second condition is determined, wherein:
  the operative state of the engine corresponds to an engine running state (SYSTEM RUNNING);
  said battery parameter (pam_bat) indicating the battery state of charge ($SOC_{meas}$) is either higher than or equal to a predetermined charge threshold ($SOC_{lim}$); and
  said first vehicle parameter (Acc) indicates a deceleration of the motor vehicle (3).

3. Automotive electrical system according to claim 2, wherein said alternator electronic control system (9) is configured to implement a third procedure of regulating said electric regulation voltage ($V_{reg}$) when a third condition is determined, wherein:
  the operative state of the internal combustion engine (2) corresponds to an engine running state (SYSTEM RUNNING);
  a battery parameter (pam_bat) indicating the battery state of charge ($SOC_{meas}$) is either higher than or equal to a predetermined charge threshold ($SOC_{lim}$); and
  said first vehicle parameter (Acc) indicating the acceleration of the motor vehicle (3) is positive and lower than said first predetermined threshold ($ACC_{lim}$).

4. Automotive electrical system according to claim 3, wherein said system (9) is configured to implement a fourth regulation procedure adapted to assign a predetermined value to said electric regulation voltage ($V_{reg}$) when a fourth condition is determined, wherein:
  the operative vehicle/engine state corresponds to an engine running state (SYSTEM RUNNING);
  said battery parameter (pa_bat) indicating the battery state of charge ($SOC_{meas}$) is lower than a predetermined charge threshold ($SOC_{lim}$); and
  said first vehicle parameter (Acc) indicating the acceleration of the motor vehicle (3) is positive and lower than said first predetermined threshold ($ACC_{lim}$).

5. Automotive electrical system according to claim 1, wherein said first control procedure is designed so that, when run, the electronic control system (9) is configured to:
  determine on objective voltage ($V_{obj}$);
  calculate an error signal ($V_{err}$) indicating the difference between the objective voltage ($V_{obj}$) and the measured battery voltage ($V_{bat\_meas}$);
  determine said regulation voltage ($V_{reg}$) by means of an open-loop regulation system/circuit (26) of proportional-integral type according to the error signal ($V_{err}$) and to the objective voltage ($V_{obj}$).

6. Automotive electrical system according to claim 5, wherein said first control procedure is designed so that, when run, the electronic control system (9) is configured to:
  calculate a main electric supply range ($\Delta Vlimit(VMIN_P, VMAX_P)$) according to the maximum/minimum voltages ($Vmax_i, Vmin_i$) which delimit the electric power supply ranges ($\Delta V(Vmin_i, Vmax_i)$) of the running vehicle electrical loads (8);
  calculate a first voltage ($VECM_{lim}$) related to the actuation of electronic vehicle appliances (25) rotated by said internal combustion engine (2);
  calculate a second voltage ($V1(I_{bat})$) related to a battery parameter (pam_bat) indicating the battery current ($I_{bat\_meas}$);
  calculate said objective voltage ($V_{obj}$) by determining the upper extreme between the lower voltage ($VMIN_P$) of said main electric supply range ($\Delta Vlimit(VMIN_P, VMAX_P)$), said voltage ($VECM_{lim}$) and said voltage ($V1(I_{bat\_meas})$).

7. Automotive electrical system according to claim 5, wherein said second control procedure is designed so that, when run, the alternator electronic control system (9) is configured to:

calculate a main electric supply range (ΔVlimit(VMIN$_P$, VMAX$_P$)) according to the maximum/minimum voltages (Vmax$_i$,Vmin$_i$) which delimit the electric power supply ranges (ΔV(Vmin$_i$,Vmax$_i$)) of the single running electric vehicle loads (8);

calculate a first voltage (VECM$_{lim}$) related to the actuation of the electronic vehicle appliances (25);

calculate a second voltage (V1(I$_{bat\_meas}$)) related to a battery parameter indicating the battery current (I$_{bat\_meas}$);

calculate a third voltage (V2(en_sp)) related to a vehicle parameter indicating the revolution speed of the engine (en_sp);

calculate the objective voltage (V$_{obj}$) by determining the lower extreme between: the upper voltage (VMAX$_P$) of the main electric supply range (ΔVlimit(VMIN$_P$, VMAX$_P$)), the first voltage (VECM$_{lim}$), the second voltage (V1(I$_{bat\_meas}$)) and the third voltage (V2(en_sp)).

8. Automotive electrical system according to claim 5, wherein said open-loop regulation system/circuit (26) of proportional-integral type is configured to:

receive the input objective voltage (V$_{obj}$) and a battery voltage (V$_{bat\_meas}$) so as to output an error signal (V$_{err}$) indicating the difference between the measured battery voltage (V$_{bat\_meas}$) and the objective voltage (V$_{obj}$);

integrate the error signal (V$_{err}$) multiplied by a constant (K1) so as to determine an integrated error signal (V$_{err}$) over time;

determine a compensated objective voltage (V$_{obj}$') by adding the integrated error signal (V$_{err}$) to the objective voltage (V$_{obj}$);

determine the regulation voltage (V$_{reg}$), by limiting the derivative of the compensated objective voltage (V$_{obj}$') within a predetermined maximum-minimum derivation range over time.

9. Automotive electrical system according to claim 3, wherein the third procedure is designed so that, when run, the alternator electronic control system (9) is configured to:

determine, by means of a closed-loop control system/circuit (32), the regulation voltage (V$_{reg}$) according to a difference (ΔSOC) between the objective charge state (SOC$_{\_obj}$) of the electric battery (6) and the measured state of charge (SOC$_{\_meas}$) thereof.

10. Automotive electrical system according to claim 9, wherein the third procedure is designed so that, when run, the alternator electronic control system (9) is configured to determine the objective charge state (SOC$_{obj}$) by means of the following function:

$$SOC_{obj}=K+f1(vn\_sp)+f2(en\_sp)+f3(load\_v)+f4(tes))$$

wherein: K is a predetermined constant, f1(vn_sp) is a function which allows to determine a value indicating a state of charge of the electric battery (6) as the speed (vn_sp) of the motor vehicle (2) varies;

f2(en_sp) is a function which allows to determine a value indicating a state of charge of the battery as the engine speed (en_sp) varies;

f3(load_v) is a function which allows to determine a value indicating a state of charge of the battery as the torque (load_v) varies;

f4(tes) is a function which allows to determine a value indicating a state of charge of the battery (6) as the external temperature (tes) of the battery (6) varies.

11. Automotive electrical system according to claim 10, wherein said closed-loop control system/circuit (32) is configured so to:

receive the input objective state of charge (SOC$_{obj}$) and the measured state of charge (SOC$_{meas}$) so as to output a signal indicating the charge difference (ΔSOC) between the two states;

calculate an objective current (I$_{obj}$) according to the charge difference (ΔSOC), by means of a function (I$_{obj}$(ΔSOC)) having a substantially linear, discontinuous pattern;

determine a compensation factor (ICS) of the objective current (I$_{obj}$) according to the charge difference (ΔSOC) and to the objective current (I$_{obj}$);

determine an objective current difference (ΔI$_{obj}$) as follows:

$$\Delta I_{obj}=I_{obj}+ICS-I_{bat\_meas};$$

determine a voltage variation (ΔV$_{reg}$) by means of a predetermined stepped function (ΔV$_{reg}$=fg(ΔI$_{obj}$)) according to the objective current difference (ΔI$_{obj}$);

determine the regulation voltage (V$_{reg}$) according to the calculated voltage variation (ΔV$_{reg}$) and to the regulation voltage (V$_{reg\_old}$) determined in a preceding calculation instant.

12. Automotive electrical system according to claim 4, wherein said fourth regulation procedure is designed so that, when run, the alternator electronic control system (9) is configured to generate a predetermined regulation voltage (V$_{reg\_QUICK}$) having a value from 90 to 100% of a nominal battery voltage (V$_{bat\_nom}$).

13. Automotive electrical system according to claim 1, wherein said alternator electronic control system (9) is configured to implement a fifth regulation procedure of the alternator 4 (block 270) when the internal combustion engine 2 is in the cranking step.

14. Automotive electrical system according to claim 1, wherein said fifth regulation procedure is designed so that, when run, the alternator electronic control system (9) is configured to:

determine a first predetermined minimum regulation voltage (V1$_{reg\_Crank}$) when, during cranking, the engine rpm (en_sp) is lower than a predetermined threshold (EN1);

determine a second predetermined maximum regulation voltage (V2$_{reg\_Crank}$), higher than the first predetermined minimum regulation voltage (V1$_{reg\_Crank}$) when, during cranking, the engine rpm (en_sp) is higher than the threshold (EN1).

15. Automotive electrical system according to claim 1, wherein said alternator electronic control system (9) is configured to implement a sixth regulation procedure of the regulation voltage (V$_{reg}$) when the internal combustion engine 2 is off.

16. Automotive electrical system according to claim 15, wherein said sixth regulation procedure is designed so that, when run, the alternator electronic control system (9) is configured to generate a predetermined regulation voltage (V$_{reg\_CAL}$) having a value which may be calibrated from 13.5 V to 14.5 V.

17. Automotive electrical system according to claim 16, wherein said alternator electronic control system (9) is configured to implement said third regulation procedure at predetermined time intervals so as to obtain a high objective charge (SOC$_{obj}$).

18. A motor vehicle (2) comprising an automotive electrical system (1) according to claim 1.

19. An alternator electronic control system (9) for an automotive electrical system (1), as claimed in claim 1.

20. A vehicle electronic control unit (18) for an automotive electrical system (1), as claimed in claim 1.

21. A software loadable in a vehicle electronic control unit (18) and designed so that, when run, the vehicle electronic control unit (18) is configured as claimed in claim 1.

\* \* \* \* \*